(12) United States Patent
Hansson

(10) Patent No.: US 8,684,640 B2
(45) Date of Patent: Apr. 1, 2014

(54) REAMING TOOL AS WELL AS A HEAD AND A CUTTING INSERT THEREFOR

(75) Inventor: Per Hansson, Gävle (SE)

(73) Assignee: Sandvik Intellectual Property AG, Sandviken (SE)

( * ) Notice: Subject to any disclaimer, the term of this patent is extended or adjusted under 35 U.S.C. 154(b) by 206 days.

(21) Appl. No.: 13/336,052

(22) Filed: Dec. 23, 2011

(65) Prior Publication Data

US 2012/0269593 A1     Oct. 25, 2012

(30) Foreign Application Priority Data

Dec. 28, 2010  (SE) ..................................... 1051378

(51) Int. Cl.
*B23D 77/02*    (2006.01)
(52) U.S. Cl.
USPC ............ 408/188; 408/200; 408/227; 408/713
(58) Field of Classification Search
CPC ................................................ B23C 2200/161
USPC .................. 408/188, 187, 200, 227, 233, 713
See application file for complete search history.

(56) References Cited

U.S. PATENT DOCUMENTS

| | | | |
|---|---|---|---|
| 4,130,371 A | 12/1978 | Druxeis | |
| 5,931,613 A * | 8/1999 | Larsson | 407/103 |
| 6,048,140 A | 4/2000 | Johnson | |
| 6,203,251 B1 * | 3/2001 | Oppelt et al. | 407/48 |
| 6,884,008 B2 * | 4/2005 | Minshall | 407/113 |
| 7,322,777 B2 * | 1/2008 | Jager et al. | 408/153 |
| 7,510,354 B2 * | 3/2009 | Andersson et al. | 407/113 |
| 8,506,213 B2 * | 8/2013 | Mergenthaler | 408/225 |
| 8,596,933 B2 * | 12/2013 | Ryu | 407/42 |
| 2005/0019119 A1 * | 1/2005 | Jager | 408/191 |
| 2006/0056925 A1 | 3/2006 | Hecht et al. | |
| 2010/0183384 A1 | 7/2010 | Kruszynski et al. | |

FOREIGN PATENT DOCUMENTS

| | | |
|---|---|---|
| DE | 10 2005 035 140 | 1/2007 |
| WO | 2006/081954 | 8/2006 |

OTHER PUBLICATIONS

European Search Report for Application No. 11 19 2375, dated Apr. 16, 2012.

* cited by examiner

*Primary Examiner* — Daniel Howell
*Assistant Examiner* — Nicole N Ramos
(74) *Attorney, Agent, or Firm* — Morgan, Lewis & Bockius LLP

(57) ABSTRACT

Reaming tool includes a head and a detachable cutting insert fixed in a seat. The seat includes radial, tangential, and axial support surfaces, while the cutting insert has a mirror-symmetrical polyhedron shape comprising six limiting surfaces, viz. two chip surfaces and at least two clearance surfaces, a number of alternately usable, identical cutting edges formed in transitions between the chip and clearance surfaces. A female- or male-like securing means co-operates with a complementary, male- or female-like securing means in the seat, more precisely in an inactive, contactless state as long as the cutting insert is held pressed by the cutting forces against the axial support surface. The securing means is activatable when the cutting insert is unintentionally distanced from the axial support surface against the action of a clamping member. Tool head and reaming insert for the tool are disclosed.

18 Claims, 9 Drawing Sheets

REAMING TOOL AS WELL AS A HEAD AND A CUTTING INSERT THEREFOR

RELATED APPLICATION DATA

This application is based on and claims priority under 37 U.S.C. §119 to Swedish Application No. 1051378-6, filed Dec. 28, 2010, the entire contents of which are incorporated herein by reference.

FIELD OF THE DISCLOSURE

In a first aspect, the present disclosure relates to a reaming tool of the type that comprises a driving rod and a head that has a rotationally symmetrical basic shape and is equipped with one or more detachable cutting inserts, which head comprises front and rear end surfaces, an envelope surface concentric with a centre axis, and a seat that is countersunk in the envelope surface and includes three support surfaces, viz. a radial support surface, a tangential support surface and an axial support surface, the cutting insert having the shape of a mirror-symmetrical polyhedron that comprises six limiting surfaces, two opposite and mutually parallel ones of which are equidistantly separated from a central symmetry plane and form chip surfaces that connect to limiting surfaces serving as clearance surfaces via alternately usable, identical cutting edges, and a clamping member holding the cutting insert fixed in the seat. In additional aspects, the present disclosure also relates to a tool head and a cutting insert as such.

BACKGROUND

In the discussion that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention.

Tools of the above-related kind are used to ream holes in metallic workpieces by chip removing or cutting machining with the purpose of giving the holes a cylindrical, smooth surface of a certain diameter. A product, which advantageously can be machined by means of the tool, is tube blanks, the interior of which for different reasons has to be dimensionally accurate and have a high surface smoothness. A usual method for, in practice, carrying out machining of just tube blanks is so-called pull boring. The tool is then connected with one end of a bar or long narrow carrier, which has an outer diameter that is smaller than the inner diameter of the tube blank, and which in a first step is brought through the tube blank so that the tool can be applied on the free end thereof, e.g. via a threaded joint, after which the reaming operation is undertaken by a combination of rectilinear and rotary relative motions between the tool and the tube blank. In just pull boring, the tool is fed longitudinally by being pulled through the interior of the tube blank without rotating, at the same time as the tube blank is brought to rotate without longitudinal feed. By these relative motions, the cutting inserts detachably mounted on the tool head will, in a way characteristic of cutting machining, remove chips from the hole wall while generating a cylinder surface having good dimensional accuracy and surface smoothness.

Although the present reaming method usually is reliable and well functioning, at times mishaps occur requiring that the machining operation is interrupted and that the tool is retracted out of the interior of the tube blank. Examples of mishaps are that one or more cutting inserts become damaged or come loose from the tool head, or that the driving machine facility stops. In connection with such interruptions, previously (commercially) known reaming tools may give rise to problems. Accordingly, the intact cutting inserts of the tool head can be jammed against the interior of the tube blank, wherein the cutting inserts are subjected to a reverse interaction of forces that tends to dislodge the cutting inserts out of their predetermined, accurately defined locations in the seats of the tool head. Instead of being held pressed automatically against above all the axial support surface, but also the tangential support surface, by the cutting forces during operation, the cutting insert is subjected to an aim to be dislodged out of the seat. Irrespective of whether the clamping member in question is a screw or a clamp/wedge, this has poor chances of withstanding the reversed forces. Characteristic of a screw is, in this connection, that it has good tensile strength, but considerably inferior bending strength. Particularly if the tool has a moderate diameter and the cutting inserts as well as the screws are relatively small, therefore, it often occurs that the screws yield to the unpredicted, reversed forces that are applied from the cutting insert.

SUMMARY

In a first aspect, the present disclosure aims at obviating the above-mentioned disadvantage of reaming tools previously known (by commercialization), and at providing an improved tool of this type. Accordingly, a primary object is to provide a reaming tool, the undamaged, intact cutting inserts of which remain reliably in the mounted locations thereof in the seats of the tool head in connection with possible extraction of the tool out of a hole being reamed, more. The above-mentioned objects are achieved, for example, by, in at least one of the limiting surfaces of the cutting insert, there is formed a female- or male-like securing means that co-operates with a complementary, male- or female-like securing means in the seat, more precisely in an inactive, contactless state as long as the cutting insert is held pressed against the axial support surface of the seat, the securing means being potentially activatable by being brought into contact with each other in case the cutting insert would unintentionally be distanced from the axial support surface against the action of the clamping member. Preferred embodiments of the disclosed reaming tool are further defined below.

In additional aspects, the disclosure provides a tool head as well as a reaming insert that, by means of improved properties, guarantee a good function of the assembled tool. The unique features of the tool head as well as the individual cutting insert are disclosed herein.

The present disclosure is based on the idea of arranging securing means in the interface between a reaming insert and its seat in the tool head, in particular between the radial support surface of the seat and an under side of the cutting insert, which means are potentially activatable with the purpose of relieving the pressure on the clamping member so that this alone does not need to carry such reversed forces that may arise if the tool needs to be retracted out of the hole that is being machined. Advantageously, these securing means may be embodied in the form of a male-like stop lug and a female-like countersink or cavity, which in normal circumstances, i.e., as long as the cutting insert is held pressed against the support surfaces of the seat by the cutting forces (since the screw or the clamping member only has the purpose of holding the cutting insert in place), are inactive by not being in contact with each other. For instance, the contact surface of the cavity and a co-operating shoulder surface on the stop lug may be separated by one or a few hundredths of a millimeter. In trouble-free operation, the securing means remain inactive without detrimentally affecting the exact positioning of the cutting insert in the seat or giving rise to so-called overdeterminations. Only when the tool would need to be returned out of the hole and the cutting insert is subjected to a reverse interaction of forces, the securing means quickly take action and guarantee that the cutting insert is not displaced appreciably from its original location in the seat.

By the fact that the securing means normally have no contact with each other, they differ from such male and female members that engage in each other and are included in previously known interfaces between cutting insert and seat, and that have the purpose of carrying cutting forces, inasmuch as such members always are held pressed in contact with each other.

An exemplary embodiment of a reaming tool comprises a driving rod, a head that has a rotationally symmetrical basic shape and is equipped with one or more detachable cutting inserts, and a clamping member, wherein the head comprises front and rear end surfaces, an envelope surface concentric with a centre axis (C), and a seat that is countersunk in the envelope surface and includes three support surfaces, viz. a radial support surface, a tangential support surface and an axial support surface, wherein the cutting insert has the shape of a mirror-symmetrical polyhedron that comprises six limiting surfaces, two opposite and mutually parallel ones of which are equidistantly separated from a central symmetry plane (SP1) and form chip surfaces that connect to limiting surfaces serving as clearance surfaces via alternately usable, identical cutting edges, wherein the clamping member holds the cutting insert fixed in the seat, and wherein, in at least one of the limiting surfaces of the cutting insert, there is formed a female- or male-like securing means that co-operates with a complementary, male- or female-like securing means in the seat, more precisely in an inactive, contactless state as long as the cutting insert is held pressed against the axial support surface of the seat, the securing means being potentially activatable by being brought into contact with each other in case the cutting insert would unintentionally be distanced from the axial support surface against the action of the clamping member.

An examplery reaming insert for a reaming tool including a driving rod, a head that has a rotationally symmetrical basic shape and is equipped with one or more detachable cutting inserts, and a clamping member, wherein the head comprises front and rear end surfaces, an envelope surface concentric with a centre axis (C), and a seat that is countersunk in the envelope surface and includes three support surfaces, viz. a radial support surface, a tangential support surface and an axial support surface, wherein the cutting insert has the shape of a mirror-symmetrical polyhedron that comprises six limiting surfaces, two opposite and mutually parallel ones of which are equidistantly separated from a central symmetry plane (SP1) and form chip surfaces that connect to limiting surfaces serving as clearance surfaces via alternately usable, identical cutting edges, wherein the clamping member holds the cutting insert fixed in the seat, and wherein, in at least one of the limiting surfaces of the cutting insert, there is formed a female- or male-like securing means that co-operates with a complementary, male- or female-like securing means in the seat, more precisely in an inactive, contactless state as long as the cutting insert is held pressed against the axial support surface of the seat, the securing means being potentially activatable by being brought into contact with each other in case the cutting insert would unintentionally be distanced from the axial support surface against the action of the clamping member, the reaming insert comprises a female- or male-like securing means, wherein the reaming insert has the shape of a mirror-symmetrical polyhedron that comprises six limiting surfaces, two opposite and mutually parallel ones of which are equidistantly separated from a central symmetry plane (SP1) and form chip surfaces that connect to limiting surfaces serving as clearance surfaces via alternately usable, identical cutting edges, and wherein the female- or male-like securing means is formed in at least one of the limiting surfaces and has the latent purpose of—in co-operation with a complementary male- or female-like securing means in a seat receiving the cutting insert—counteracting unintentional displacement of the cutting insert in the seat.

BRIEF DESCRIPTION OF THE DRAWING

The following detailed description of preferred embodiments can be read in connection with the accompanying drawings in which like numerals designate like elements and in which.

DETAILED DESCRIPTION

In the following text, there will be described a large number of surfaces and edges on a cutting insert having the shape of a prismatic body as well as in a seat in which the cutting insert is mounted. In order to distinguish these surfaces and edges with the purpose of providing conceptual clarity, henceforth, there are used denominations that vary depending on if they relate to the geometrical shape of the cutting body and seat, respectively, or to the function of the surfaces/edges in connection with chip removal. Accordingly, the concept "limiting surfaces" is found in connection with the shape of the cutting insert being described, while the concepts "chip surfaces and clearance surfaces, respectively," are used when the function of the surfaces will be made clear. In an analogous way, "edge" is used in connection with the insert shape, but if an edge is utilized for chip removal or surface wiping, the concepts "cutting edge" and "secondary edge" or "wiper edge", respectively, are used. If an edge only has the purpose of delimiting two limiting surfaces from each other, but is not utilized for machining purposes, then the same will, on the other hand, be denominated "boundary edge or boundary line". Furthermore, certain surfaces in the individual seat are generally denominated "shoulder surfaces", while the surfaces on the cutting insert that are pressed against the shoulder surfaces are denominated "contact surfaces". Furthermore, the concepts "invertible" and "indexable", respectively, are found. The fact that the disclosed cutting insert "is inverted" means that a previously outwardly exposed chip surface faces inward to a support surface with the purpose of exposing another, mirror-symmetrical chip surface outward. The fact that the cutting insert "is indexed" means that the same—after dismounting—is rotated 180° around its own centre axis, and after that remounted in the seat. The object of inversion as well as indexing of the cutting insert is, in the usual way, to change into an unused cutting edge, when a previously active cutting edge has been worn out, wherein each individual cutting edge should assume one and the same spatial position in the tool head.

As a matter of form, it should also be pointed out that the cutting insert usually is manufactured from cemented carbide or another, hard and wear-resistant material, while the tool head is made of a softer material, in particular steel. The materials in the workpieces to be machined are primarily metallic, although also other materials, e.g. composites, may occur.

Figure 1:
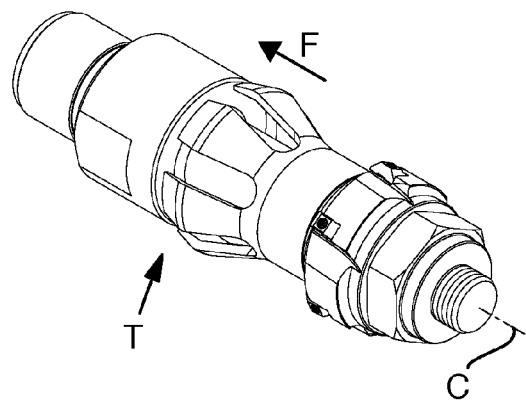
FIG. 1 is a perspective view of the disclosed reaming tool in the assembled state.
Figure 2:
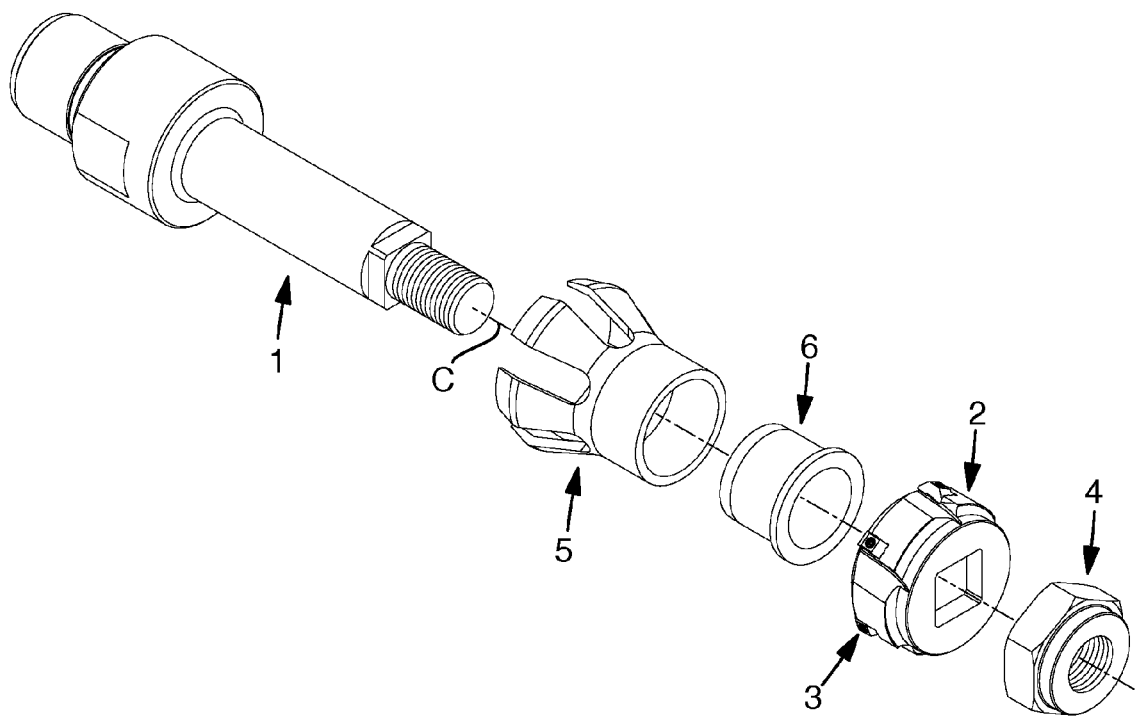
FIG. 2 is a perspective exploded view of the same tool.
Figure 3:
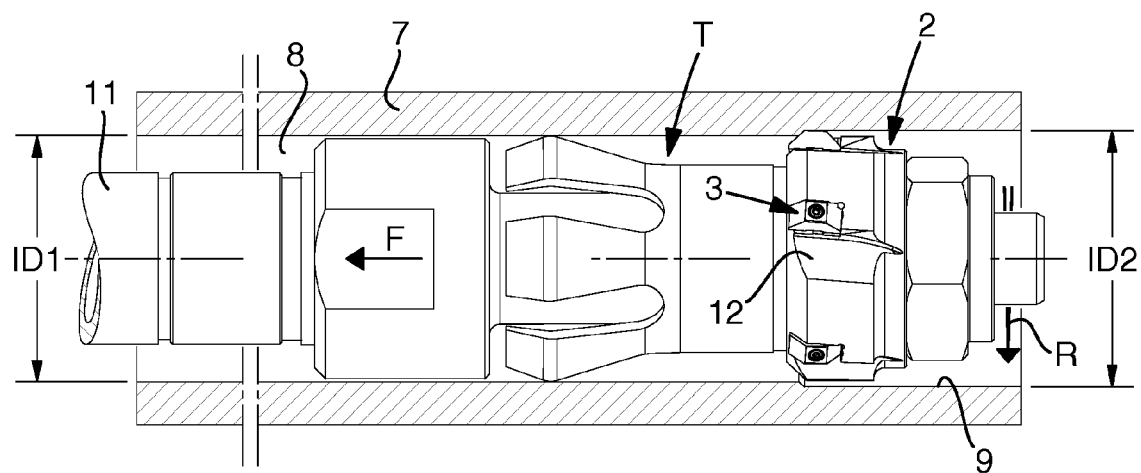
FIG. 3 is a side view of the tool during the reaming of a hole in a workpiece in the form of a tube blank, which in turn is shown in longitudinal section.

The reaming tool T shown in FIGS. 1-3 includes three main components, viz. a driving rod 1, a head 2 and a number of cutting inserts 3 detachably mounted on the head. In the shown embodiment of the tool, there are further included a lock member in the form of a nut 4, a forerunner 5, and a bushing 6 acting between the same and the driving rod. In operation, a reaming tool can either rotate and the workpiece be fed longitudinally, or be fed longitudinally while the workpiece is rotated, in order to provide the requisite relative motions between the same. In the example shown, the last-mentioned alternative is preferred, i.e., the tool is fed longitudinally, viz. in the direction of the arrow F, while a workpiece 7 shown in the form of a tube blank is rotated in the direction of the arrow R. When the concepts "front" and "rear", respectively, are used in the following description, these relate to the longitudinal feed direction F. Accordingly, in FIGS. 1 and 2, the tool is shown from behind. If the tool is viewed from the front according to FIG. 4, in this case, the tube blank 7 rotates counter-clockwise around the centre axis C, with which the driving rod 1 as well as the components 2, 4, 5 and 6 are concentric.

The object of the present machining method, which by those skilled in the art is denominated "pull boring", is to ream the hole 8 of the workpiece or tube blank 7 and provide a cylinder surface 9 having good dimensional accuracy and high surface smoothness. Initially, the tube blank 7 has an inner diameter ID1 that may be arbitrarily great, provided that it is, on one hand, smaller than the desired, final inner diameter ID2 of the machined cylinder surface 9, and on the other hand greater than the diameter of a drawbar 11. Neither is the surface finish of the inside of importance. In a first step, the drawbar 11, e.g. in the form of a tube, is brought through the hole 8 so that the driving rod 1 of the assembled tool T can be applied to its rear, protruding end, e.g. via a threaded joint. Next, the drawbar and the tool are pulled forward through the hole 8, at the same time as the tube blank 7 is brought to rotate. In doing so, the cutting inserts 3 remove chips that are evacuated in the backward direction out of the tube blank, more precisely via evacuation channels 12 in the envelope surface of the head 2. In order to facilitate said evacuation and simultaneously guarantee that the chips do not damage the generated cylinder surface 9, a fluid, e.g. water, is advantageously flushed rearward through the tube blank.

When the tool is assembled, first the forerunner 5 and the bushing 6 are put on the driving rod 1, and then the head 2. In order to rotationally secure the head 2, this includes an opening having a polygonal (square) cross-sectional shape in which an analogously polygon-shaped driver on the driving rod engages. Finally, the head 2 is fixed by means of the lock nut 4. The forerunner 5, which includes a plurality of elastic fingers, which are resiliently tensioned against the interior of the tube blank 7 in order to centre and guide the trailing head and follow the tube blank in its rotation, can freely rotate in relation to the driving rod as a consequence of the bushing 6 serving as a bearing.

Figure 4:
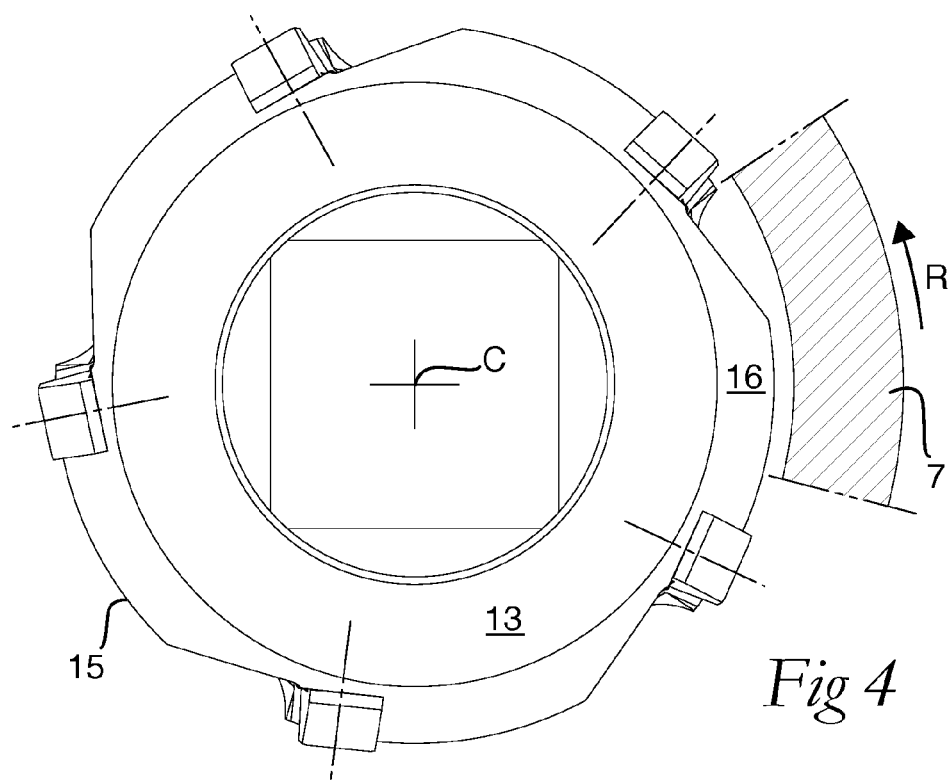
FIG. 4 is a front view of a head that is included in the tool and has mounted cutting inserts.
Figure 5:
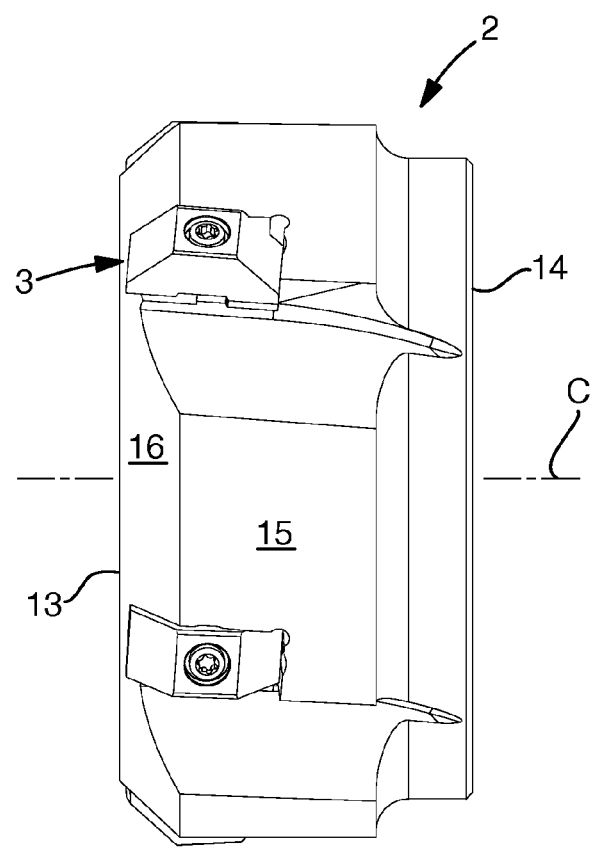
FIG. 5 is a side view of the head in the same state.
Figure 6:
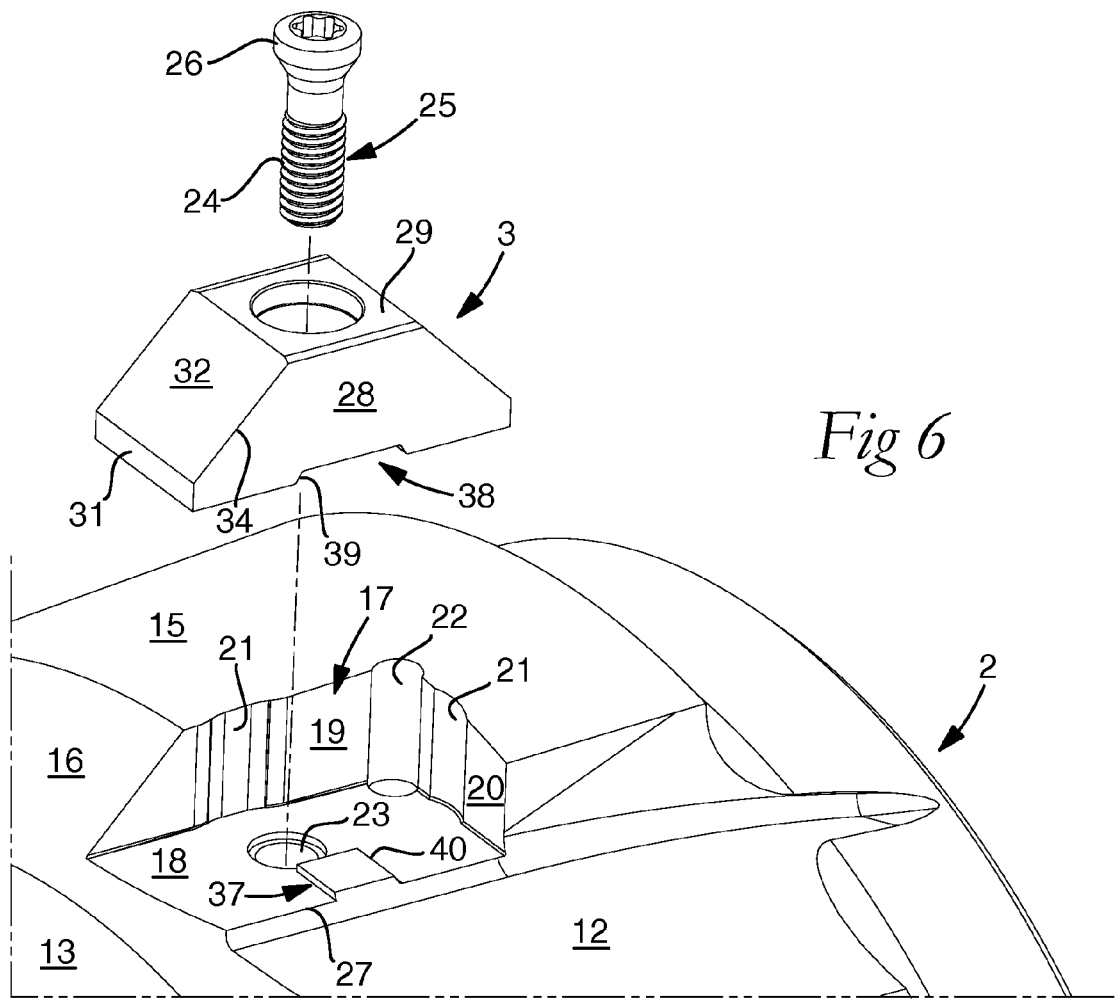
FIG. 6 is a perspective exploded view showing a seat included in the tool head, as well as a cutting insert mountable in the same, together with a tightening screw.
Figure 7:
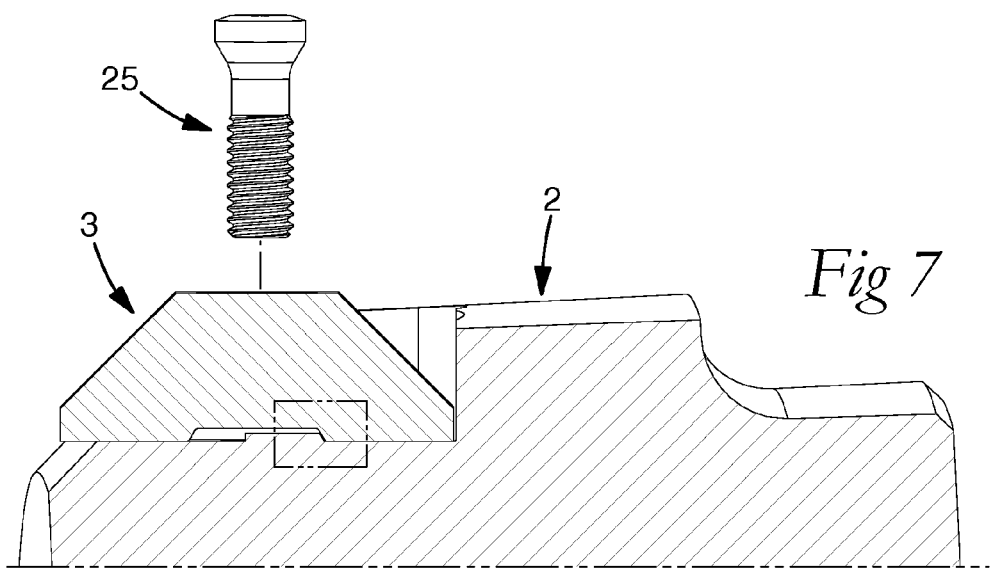
FIG. 7 is a detailed section showing the cutting insert mounted in the seat.

Reference is now made to FIGS. 4-6, which more in detail illustrate a head 2 for the disclosed reaming tool T, and which show how the same includes front and rear end surfaces 13, 14 and a cylindrical envelope surface 15, which is concentric with the centre axis C and transforms into the front, plane end surface 13 via a conical surface 16. In the envelope surface 15, a number of (in the example, five) seats 17 for the cutting insert are formed. Said seats 17 open partly in the envelope surface 15, partly in the cone surface 16. In each seat, three support surfaces are included, viz. a radial support surface 18, which carries the essentially radially directed cutting forces that act on the cutting insert; a tangential support surface 19 for the tangentially directed cutting forces; and an axial support surface 20 for the axially directed cutting forces. In the support surfaces 19 and 20, shallow ditches 21 are countersunk, which divide the individual support surface into part surfaces with the purpose of counteracting overdetermination of the cutting insert and guaranteeing an exact positioning of the same in the seat. Furthermore, there is a clearance surface 22 in the corner between the support surfaces 19 and 20. The radial support surface 18 as well as the two support surfaces 19, 20 are generally plane and in this case form an angle between themselves of 90° (also other angles, greater as well as smaller, are feasible). In a traditional way, the seat assumes a tipped-in spatial position in the head with the purpose of providing the requisite clearances for the mounted cutting insert.

In the radial support surface 18, a hole 23 mouths having a female thread (lacks designation) for the co-operation with a male thread 24 of a clamping member in the form of a screw having the purpose of fixing the cutting insert 3 in the seat 17. The screw 25, which includes a conical head 26, is spring biased in order to, upon tightening, press the cutting insert not only against the radial support surface 18 but also against the two other support surfaces 19, 20. At the boundary line 27, which is situated at a distance from the tangential support surface 19 and runs approximately parallel to the same, the radial support surface 18 transforms into the aforementioned channel 12.

In the exemplified embodiment of the disclosed reaming insert, the cutting insert has the shape of a polyhedron (see particularly FIGS. 9-11) having eight planes or limiting surfaces, viz.:

a) two opposite and mutually parallel surfaces generally designated 28, which henceforth will be denominated "chip surfaces", b) an upper side 29 and an under side 30, the last-mentioned one of which is longer than the first-mentioned one, c) a pair of opposite end surfaces 31, and d) a pair of plane surfaces 32 that serve as clearance surfaces and extend from the upper side 29 toward the end surfaces 31 and lean downward toward the same.

Figure 9:
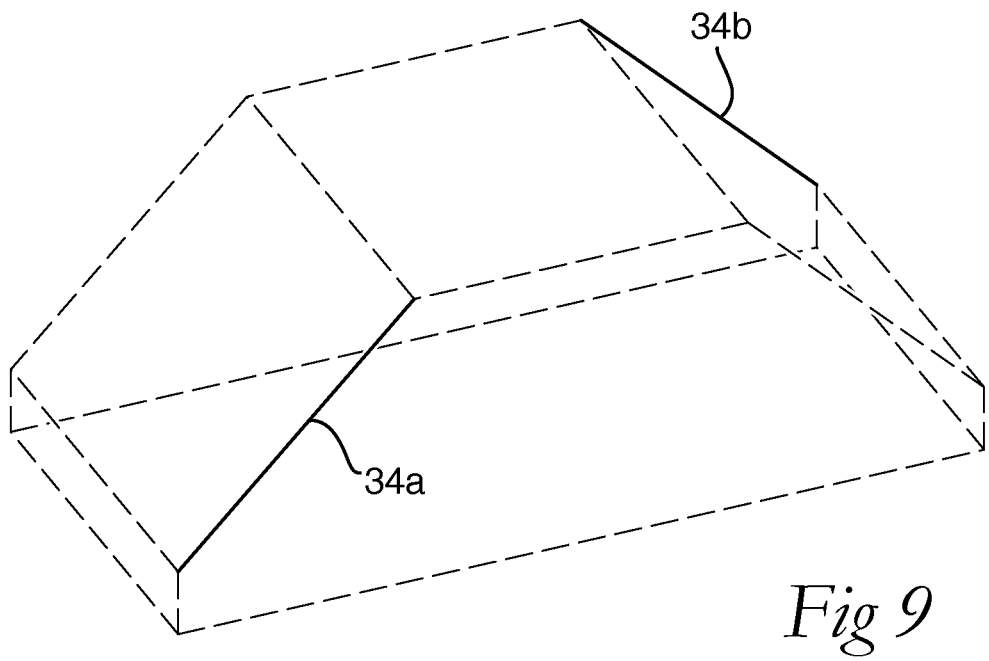
FIG. 9 is a schematic picture illustrating the fundamental, geometrical shape of the cutting insert.
Figure 10:
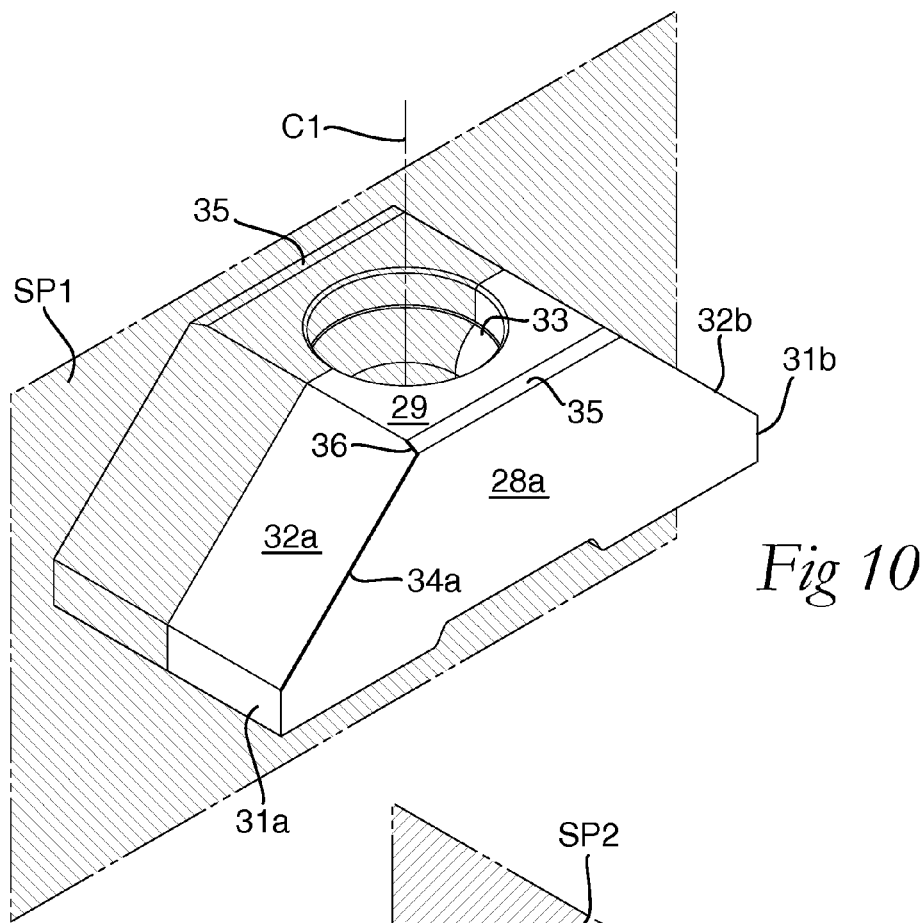
FIG. 10 is a bird's eye view of only the cutting insert.
Figure 11:
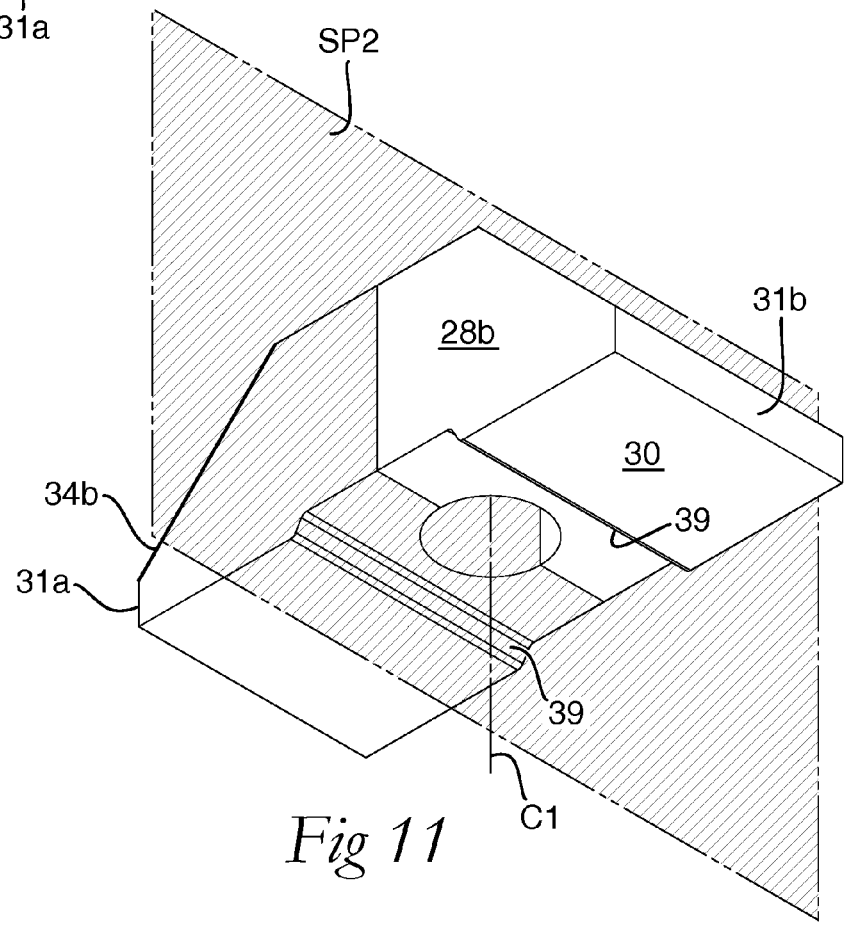
FIG. 11 is a worm's eye view of the same cutting insert.
Figure 12:
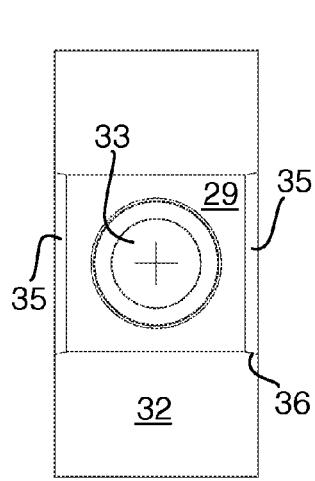
FIG. 12 is a planar view from above of the cutting insert.
Figure 13:
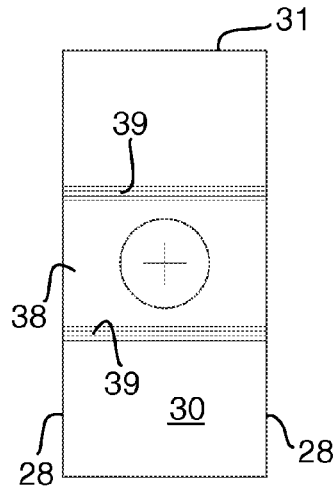
FIG. 13 is a planar view from below.

In order to distinguish paired homologous surfaces, the same have in FIGS. 10 and 11 been provided with the suffixes "a" and "b", respectively. Furthermore, in FIG. 10, a symmetry plane SP1 has been inserted halfway between the chip surfaces 28a and 28b, and in FIG. 11, a symmetry plane SP2 halfway between the end surfaces 31a, 31b. Where the symmetry planes SP1, SP2 meet each other at right angles, there is a centre axis C1 for a through hole 33 that extends between the upper and under sides 29, 30. In the cutting insert, there are included two alternately usable cutting edges, generally designated 34, for the given rotary working direction R, viz. a first cutting edge 34a, where the chip surface 28a meets the clearance surface 32a, and a second cutting edge 34b, where the chip surface 28b meets the clearance surface 32b. In FIGS. 9-11, the cutting edges 34a, 34b are marked by thick, solid lines.

Furthermore, it should be noted that between the upper side 29 and the individual chip surface 28a, 28b, a chamfer surface 35 is provided so as to form a surface-wiping secondary edge 36 (so-called wiper edge) in the corner where the surfaces 28, 29 and 32 meet each other. By selecting the angle between the chamfer surface 35 and the chip surface 28 in a suitable way in view of the shape of the cutting insert as well as the spatial tipping-in position thereof in the head 2, the wiper edge being short per se can be located along an imaginary generatrix of the cylinder surface 9 that is generated internally in the tube blank 7. As soon as the chip has been removed from the material of the tube blank, the wiper edge exerts a wiping or leveling action on the generated surface.

In previously known reaming tools of the exemplified kind, the under side 30 of the cutting insert 3 as well as the radial support surface 18 of the seat 17 are plane and smooth, i.e., have no mechanical engagement with each other. This means that such reversed forces that may arise in connection with possible extraction of the tool out of the hole that is being machined, have to be carried solely by the screw 25. Because this has a mediocre bending strength, the same may, however, easily yield and cause the cutting insert to be dislocated or entirely come loose from the seat.

Figure 8:
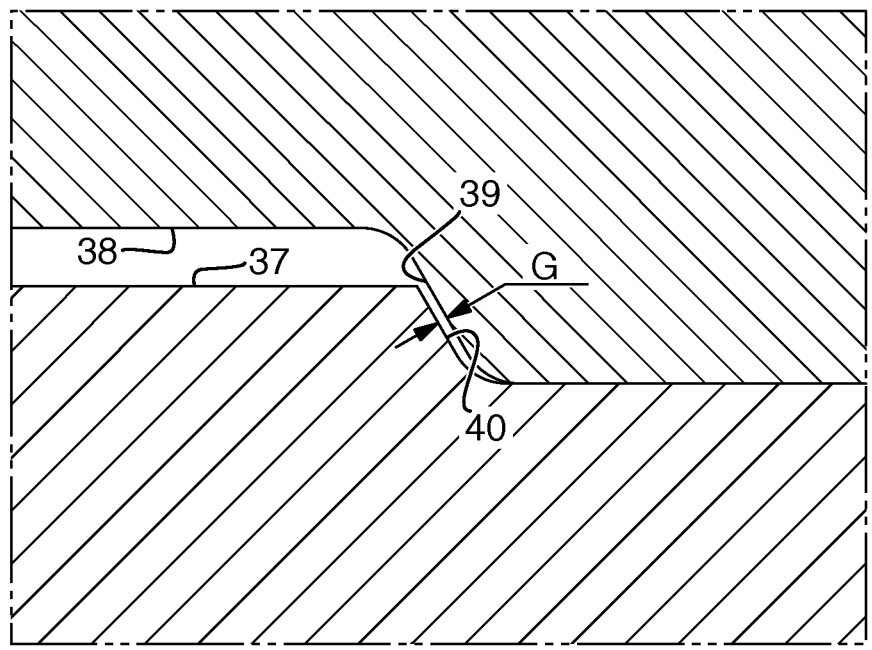
FIG. 8 is an extremely enlarged detailed section showing the play between a stop lug and a cavity forming securing means in the interface between the cutting insert and the seat.
Figure 14:
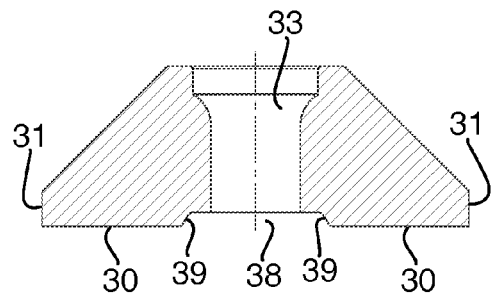
FIG. 14 is a longitudinal section through the cutting insert.

In order to obviate the above-mentioned drawback, the disclosed tool has been made with a latent securing function, which is based on the use of a combination of female and male members in the interface between the cutting insert and the seat. Accordingly, in the embodiment according to FIGS. 4-14, a male member 37, in the form of a quadrangular stop lug, is arranged along the radial support surface 18. A complementary female member in the form of a countersink 38 is simultaneously formed in the under side 30 of the cutting insert 3. In this case, the countersink 38 consists of a groove that extends between the two opposite chip surfaces 28a, 28b of the cutting insert, and has a width that is greater than the width of the stop lug 27. On the inside of the groove 38, there is a pair of opposite contact surfaces 39a, 39b (see FIG. 14 that can be alternately located in the immediate vicinity of the stop lug 37. More precisely, the individual contact surface 39 is located at a predetermined, carefully selected distance from the individual end surface 31 of the cutting insert. This distance is somewhat shorter than the distance between the axial support surface 20 and a shoulder surface 40 on the lug 37 facing the same. Therefore, as is seen by the enlarged detailed section in FIG. 8, between the shoulder surface 40 of the lug and the contact surface 39, there arises a gap G that advantageously may be maximized to 0.25 mm and amount to at least 0.02 mm. This is the case as long as the cutting insert is held pressed by the cutting forces with its rear end surface 31 against the axial support surface 20 of the seat. In other words, the two co-operating securing means in the form of the stop lug 37 and the groove 38 are inactive as long as the cutting forces hold the cutting insert pressed against the support surfaces of the seat (at the same time as the tightening screw 25 holds the cutting insert in place). However, should the cutting insert be subjected to reversed axial forces that aim to distance the same from the axial support surface 20, the latent securing function is immediately activated, more precisely by the contact surface 39 on the inside of the groove 38 being pressed against the shoulder surface 40 on the stop lug 37. In such a way, the screw 25 is relieved so far that the same is not subjected to considerable bending loads. As long as the screw can hold the under side 30 of the cutting insert pressed against the radial support surface 18, therefore the cutting insert cannot be distanced from the axial support surface 20 more than the short distance represented by the gap G.

As female member in the under side of the cutting insert, there may also be used other countersinks than just a groove of uniform width that runs from chip surface to chip surface. What is essential is only that a pair of contact surfaces 39 in the countersink are situated at exactly equally large distances from the end surfaces 31 of the cutting insert.

Figure 15:
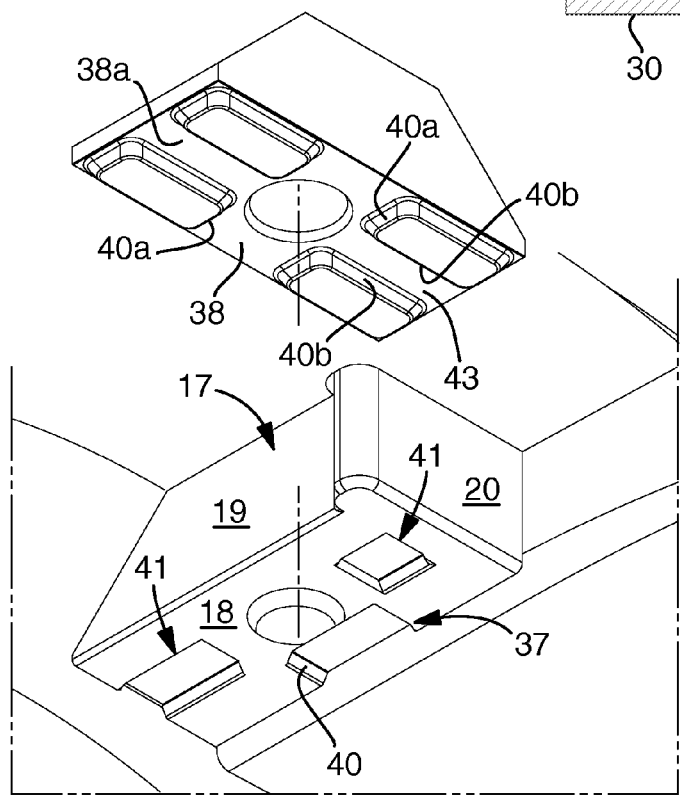
FIG. 15 is on one hand a worm's eye view showing an alternative embodiment of the disclosed reaming insert , and on the other hand a bird's eye view of a co-operating seat.
Figure 16:
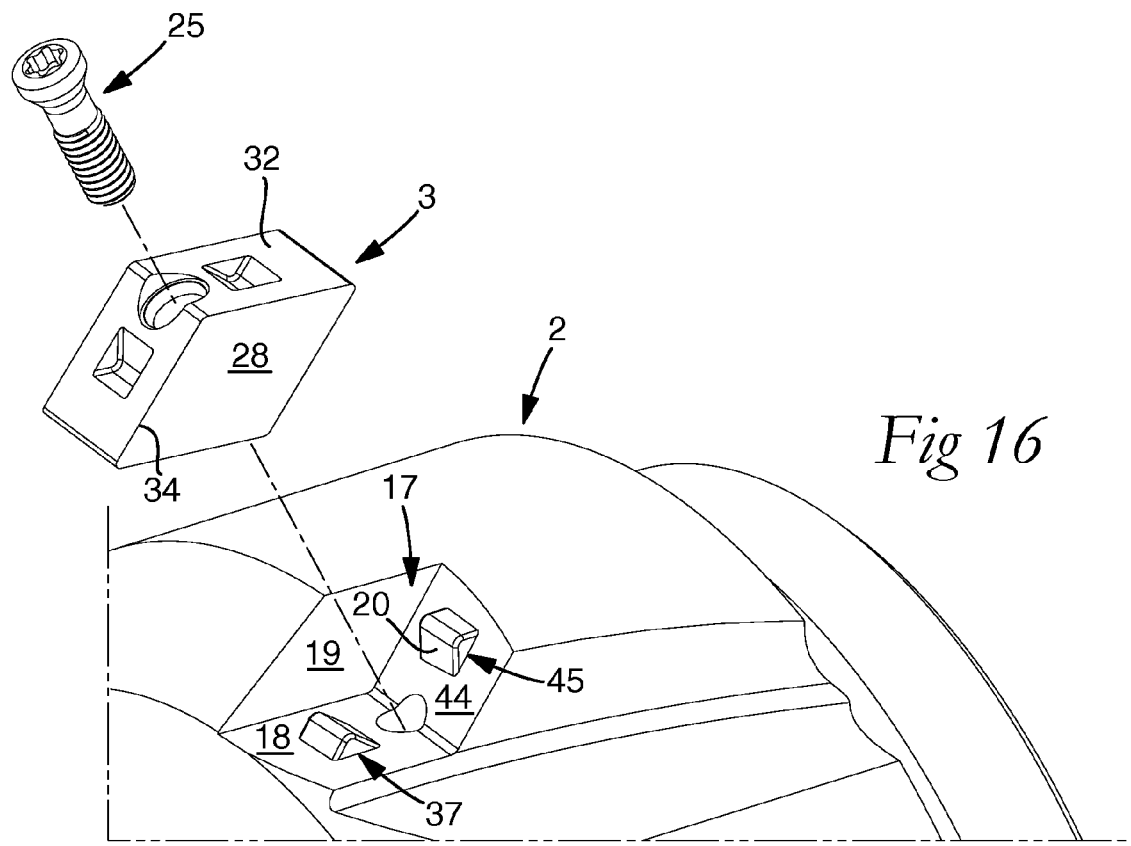
FIG. 16 is a perspective exploded view showing the disclosure applied to a new, unique cutting insert having a rhombic basic shape.

In FIG. 15, an alternative interface between the cutting insert 3 and the seat 17 is illustrated. In this case, the interface includes not only a first stop lug 37 distanced from the axial support surface 20, but also one or more second stop lugs 41 that are distanced from the tangential support surface 19. In the under side 30 of the cutting insert, there is formed a second groove 38a of uniform width so as to co-operate with the stop lugs 41, and which intersects the first groove 38 at a right angle and extends axially between the two end surfaces 31 of the cutting insert. By the fact that the two intersecting grooves 38, 38a are countersunk in the under side 30, the same will be delimited between in total four lands 43, the opposite, inwardly facing surfaces of which form alternately usable shoulder surfaces 40a/40a and 40b/40b along the groove 38 as well as the groove 38a.

By the co-operation of the additional stop lugs 41 and the longitudinal groove 38a in the cutting insert, it is guaranteed that the cutting insert neither can be distanced from the tangential support surface 19 more than what is determined by the gap between co-operating contact and shoulder surfaces 40b of the lands 43 and the stop lugs 41, respectively. In other words, the cutting insert is secured not only axially but also tangentially against reversed axial and tangential forces.

Reference is now made to FIGS. 16-19, which show alternative embodiments of a tool, which is based on the use of a new cutting insert having a unique shape. More precisely, this cutting insert is cross-sectionally rhombic and includes four similar clearance surfaces 32 that extend between two rhomb-shaped chip surfaces 28, and meet each other in pairs at obtuse angles a (see FIG. 17) in two opposite corners 43x, 43y. In the example, a amounts to 135°, but may vary, suitably within the range of 110-160°. In this case, the seat 17 in the tool head 2 includes—in addition to the radial support surface 18 and the tangential support surface 19—a slope surface 44 that forms an obtuse angle with the radial support surface 18, more precisely an angle that in all essentials corresponds to the obtuse angle a of the cutting insert. In the slope surface 44, a step 45 is formed in which the axial support surface 20 is included. Advantageously, the axial support surface 20 forms—as in the previous case—a right angle with the radial support surface 18. In each one of the four clearance surfaces 32, an outwardly open cavity 46 is formed, which includes a contact surface 47 for pressing against the axial support surface 20 (see also FIGS. 18 and 19).

Figure 17:
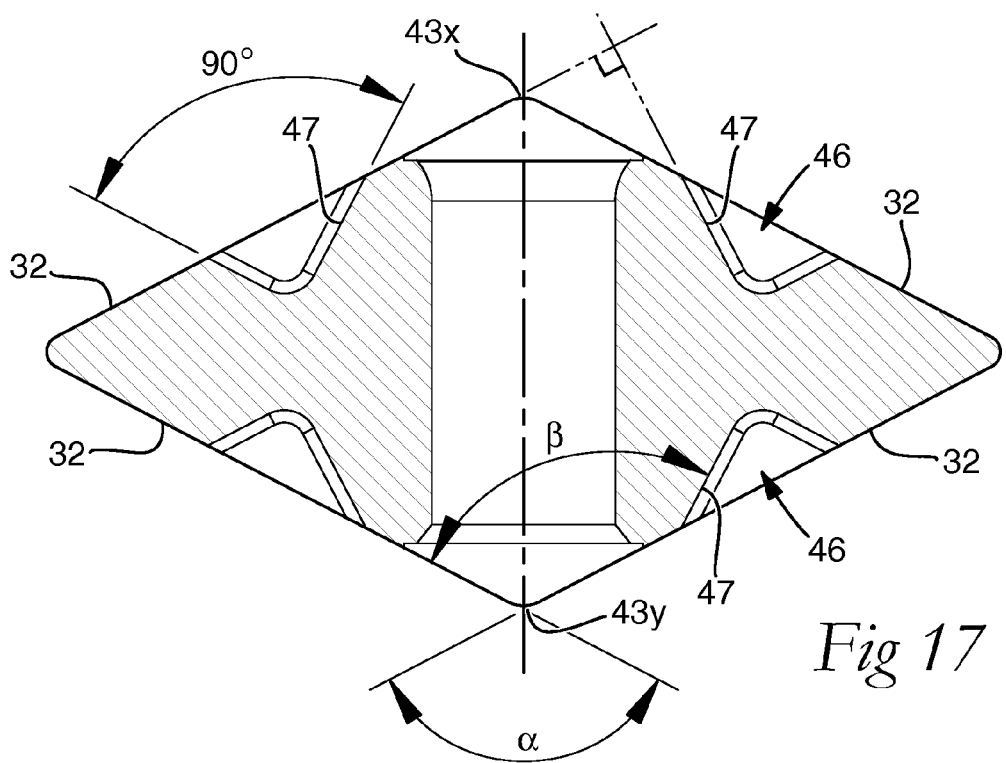
FIG. 17 is an enlarged longitudinal section through the rhombic cutting insert according to FIG. 16.
Figure 18:
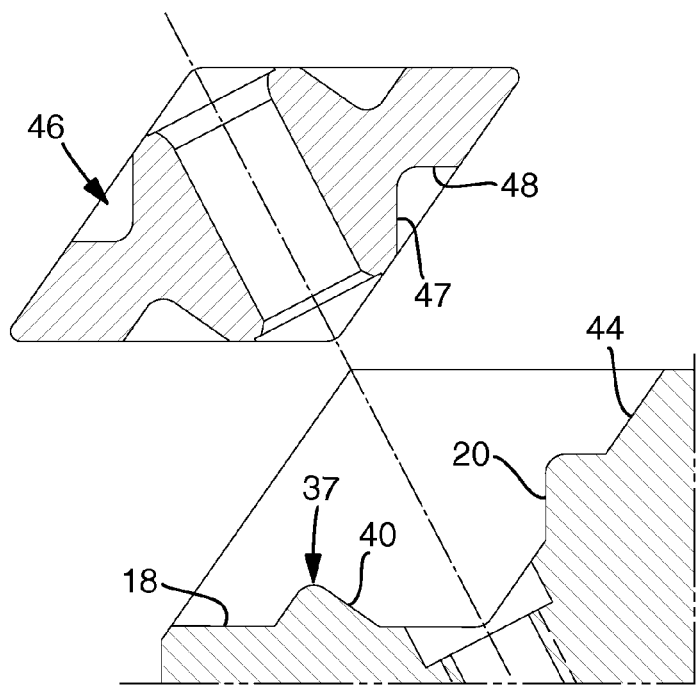
FIG. 18 is an exploded view in longitudinal section showing the rhombic cutting insert separated from the appurtenant seat in the tool head.
Figure 19:
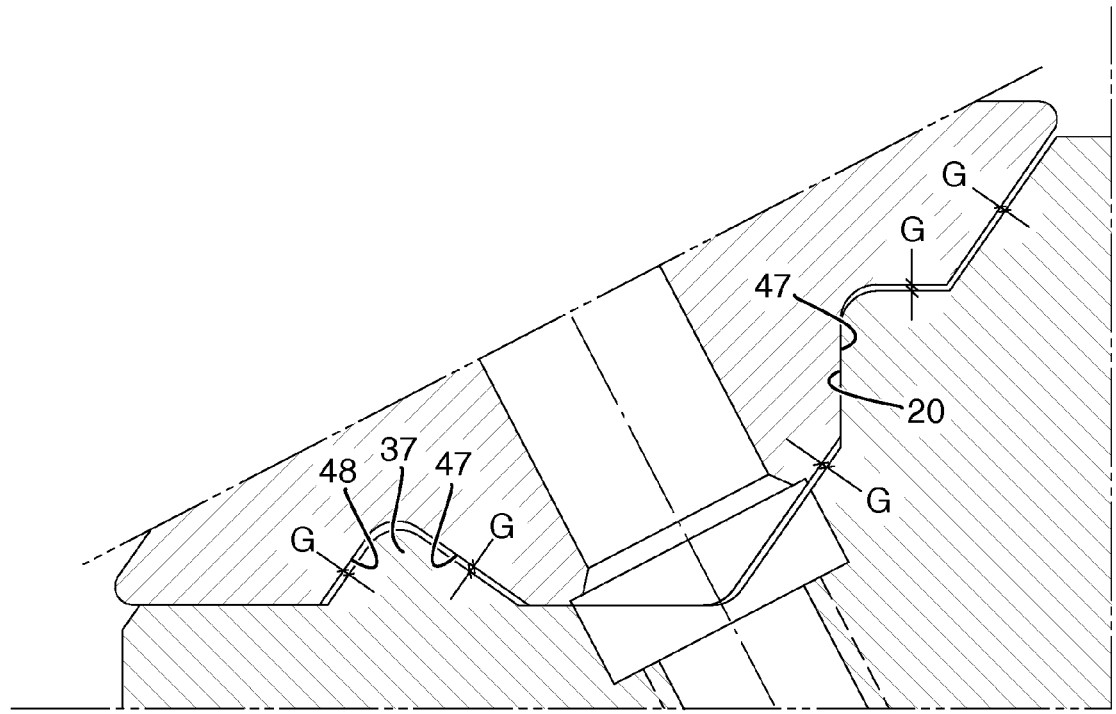
FIG. 19 is an enlarged detailed longitudinal section showing the same cutting insert mounted in the seat.

In accordance with the disclosure, also in this case, a stop lug 37 is arranged, which sticks up from the radial support surface 18. In this stop lug 37, there is included a shoulder surface 40—in analogy with the preceding case—against which the contact surface 47 of an arbitrary cavity 46 is potentially pressable. The individual cavity 46 is delimited not only by the contact surface 47 and two side walls, but also by a clearance surface 48, which in this case forms an angle of 90° with the contact surface 47. As is seen in FIG. 17, the spatial position of the cavity 46 in the cutting insert 3 is such that the contact surface 47 that is pressable against the axial support surface 20 forms an angle β of 90° with an imaginary plane in the extension of a nearby clearance surface 32 of the cutting insert. Because the axial support surface 20 of the step 45 forms an angle of 90° with the radial support surface 18, the contact surface 47 will be pressed with surface abutment against the axial support surface 20 at the same time as an inactive clearance surface 32 is in surface contact with the radial support surface 18 (the angle β may also deviate from 90°—and be within the interval of 70-130°—provided that the angle of the axial support surface 20 to the radial support surface 18 is modified correspondingly). However, in this state, which is illustrated in FIG. 19, the two surfaces 47, 48 of the cavity 46 have no contact with the stop lug 37. Between the surfaces in the cavity and the surfaces on the stop lug, there is, accordingly, a diminutive gap G of maximally 0.25 mm. If the cutting insert would be subjected to a reverse interaction of forces and aim at being distanced from the axial support surface 20, then the latent securing function provided by the surfaces 47 and 40 being quickly brought into contact with each other is activated. In other words, there is provided a latent securing function that immediately is activated if the cutting insert would come to be distanced from the axial support surface. In such a way, it is guaranteed that the cutting insert remains in the appurtenant seat even if the same is subjected to considerable, negative axial forces in connection with the tool having to be withdrawn from the hole that has been machined.

Feasible Modifications: The invention is not limited only to the embodiments described above and shown in the drawings. Accordingly, it is feasible to arrange the female-like securing means in the seat and one or more male members on the cutting insert. Furthermore, securing means may be arranged also in the tangential support surface of the seat and the chip surface of the cutting insert, respectively, either alone or in combination with securing means in the radial support surface and the clearance surface, respectively. Also, the actual shape of the female and male, respectively, members may vary most considerably, provided that the co-operating shoulder and contact surfaces can be arranged with a narrow gap therebetween in the inactive and potentially activatable state. Furthermore, the tool may be made so that the same can be pushed instead of being pulled through the hole to be reamed. Also, the mechanical coupling between the tool and the drawbar or connecting rod may have another shape than the one shown. For instance, a coupling of the type COROMANT CAPTO® may be used. In addition, the cutting insert may be fixed in the appurtenant seat by means of other clamping members than a screw, e.g. clamps, wedges or tightening fingers. Neither do the co-operating axial contact surfaces and axial support surfaces, respectively, need to be formed in cavities in the cutting insert and on a step along the slope surface, respectively. Accordingly, it is feasible to utilize the proper slope surface as axial support surface, in particular if the obtuse angle between the slope surface and the radial support surface is limited, so that the slope surface runs steeper in relation to the radial support surface than in the example shown. Neither does the angle between the chip surfaces and the individual clearance surface need to be right. Within the scope of the invention, it is furthermore possible to vary the obtuse angles of the rhomb (and acute angles, respectively) within fairly wide limits. When the axial support surface is arranged on a step along the slope surface, the obtuse angle should, however, amount to at most 160° and at least 110°. Furthermore, the cutting insert and the seat may be formed so that the radial cutting forces are carried by a portion of a clearance surface (the portion to the left of the stop lug 37 in FIG. 19) as well as by contact against the upper side of the step without designation in FIG. 19.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A reaming tool comprising:
   a driving rod;
   a head that has a rotationally symmetrical basic shape and is equipped with one or more detachable cutting inserts; and
   a clamping member,
   wherein the head comprises front and rear end surfaces, an envelope surface concentric with a centre axis (C), and a seat that is countersunk in the envelope surface and includes three support surfaces, viz. a radial support surface, a tangential support surface and an axial support surface,
   wherein the cutting insert has the shape of a mirror-symmetrical polyhedron that comprises six limiting surfaces, two opposite and mutually parallel ones of which are equidistantly separated from a central symmetry plane (SP1) and form chip surfaces that connect to limiting surfaces serving as clearance surfaces via alternately usable, identical cutting edges,
   wherein the clamping member holds the cutting insert fixed in the seat, and
   wherein, in at least one of the limiting surfaces of the cutting insert, there is formed a female- or male-like securing means that co-operates with a complementary, male- or female-like securing means in the seat, more precisely in an inactive, contactless state as long as the cutting insert is held pressed against the axial support surface of the seat, the securing means being potentially activatable by being brought into contact with each other in case the cutting insert would unintentionally be distanced from the axial support surface against the action of the clamping member.

2. The reaming tool according to claim 1, wherein said securing means consist of a female-like countersink in one of the limiting surfaces of the cutting insert as well as of a stop lug being included in a support surface separated from the axial support surface and being distanced from the axial support surface, a shoulder surface on the stop lug and a co-operating contact surface in the countersink being mutually separated by a certain play (G) in said contactless state.

3. The reaming tool according to claim 2, wherein the countersink is formed in a clearance surface of the cutting insert, while the stop lug is placed along the radial support surface of the seat.

4. The reaming tool according to claim 2, wherein the play (G) between the shoulder surface and the contact surface amounts to at most 0.25 mm.

5. The reaming tool according to claim 2, wherein two contact surfaces formed in one and the same countersink in an under side of the cutting insert are equidistantly separated from opposite ends by said under side.

6. The reaming tool according to claim 2, wherein the countersink is a groove of uniform width that runs between the opposite chip surfaces of the cutting insert.

7. The reaming tool according to claim 2, wherein the seat, in addition to said first stop lug, includes a second stop lug that is distanced from the tangential support surface and has its shoulder surface facing the same, and that the cutting insert, in addition to said first countersink, includes a second countersink having a second contact surface that is situated nearer a first chip surface than the second, opposite chip surface and is facing the last-mentioned one.

8. The reaming tool according to claim 1, wherein the cutting insert has a rhombic cross-sectional shape in the symmetry plane and includes four clearance surfaces, which meet each other in pairs at obtuse angles in two opposite corners, and that the seat, in addition to a radial support surface and a tangential support surface, includes a slope surface, which forms an obtuse angle with the radial support surface, and which includes a step in which the axial support surface is included, the securing means consisting of a stop lug included in the radial support surface of the seat as well as of a countersink in the form of a cavity in each one of the clearance surfaces of the cutting insert.

9. The reaming tool according to claim 8, wherein the axial support surface of the step extends in a plane that forms an angle of 70-110° with the radial support surface of the seat, and that a contact surface in the cavity of the cutting insert forms the same angle with an imaginary plane in the extension of a nearby clearance surface of the cutting insert.

10. A reaming insert for a reaming tool including a driving rod, a head that has a rotationally symmetrical basic shape and is equipped with one or more detachable cutting inserts, and a clamping member, wherein the head comprises front and rear end surfaces, an envelope surface concentric with a centre axis (C), and a seat that is countersunk in the envelope surface and includes three support surfaces, viz. a radial support surface, a tangential support surface and an axial support surface, wherein the cutting insert has the shape of a mirror-symmetrical polyhedron that comprises six limiting surfaces, two opposite and mutually parallel ones of which are equidistantly separated from a central symmetry plane (SP1) and form chip surfaces that connect to limiting surfaces serving as clearance surfaces via alternately usable, identical cutting edges, wherein the clamping member holds the cutting insert fixed in the seat, and wherein, in at least one of the limiting surfaces of the cutting insert, there is formed a female- or male-like securing means that co-operates with a complementary, male- or female-like securing means in the seat, more precisely in an inactive, contactless state as long as the cutting insert is held pressed against the axial support surface of the seat, the securing means being potentially activatable by being brought into contact with each other in case the cutting insert would unintentionally be distanced from the axial support surface against the action of the clamping member, the reaming insert comprising:

a female- or male-like securing means,
wherein the reaming insert has the shape of a mirror-symmetrical polyhedron that comprises six limiting surfaces, two opposite and mutually parallel ones of which are equidistantly separated from a central symmetry plane (SP1) and form chip surfaces that connect to limiting surfaces serving as clearance surfaces via alternately usable, identical cutting edges, and
wherein the female- or male-like securing means is formed in at least one of the limiting surfaces and has the latent purpose of—in co-operation with a complementary male- or female-like securing means in a seat receiving the cutting insert—counteracting unintentional displacement of the cutting insert in the seat.

11. The reaming insert according to claim 10, wherein the securing means is a countersink formed in a limiting surface and having a contact surface for pressing against a shoulder surface in the seat.

12. The reaming insert according to claim 11, wherein the countersink in one and the same limiting surface includes two homologous contact surfaces that are equidistantly separated from the respective ends of the limiting surface to which they are facing.

13. The reaming insert according to claim 11, wherein the countersink is a groove of uniform width that runs between the opposite chip surfaces.

14. The reaming insert according to claim 13, wherein the same, in addition to a first groove, includes a second groove that is formed in the same limiting surface, runs between the opposite ends of the limiting surface, and intersects the first groove at right angles in the centre of the cutting insert.

15. The reaming insert according to claim 11, wherein the cutting insert has a rhombic cross-sectional shape and includes four clearance surfaces, which meet each other in pairs at obtuse angles ($\alpha$) in two opposite corners, the securing means being a countersink that is formed in each one of the clearance surfaces and has the form of a cavity having a contact surface that in all cavities is located at one and the same distance from the nearest corner.

16. The reaming insert according to claim 15, wherein the contact surface in the cavity in one of two clearance surfaces that meet in an obtuse-angled corner forms an angle of 70-110° with the plane in which the second clearance surface adjacent to the same corner is situated.

17. A rotationally symmetrical head for a reaming tool according to any claim 1, comprising front and rear end surfaces, an envelope surface concentric with a centre axis (C), as well as a seat that is intended for the receipt of a cutting insert, is countersunk in the envelope surface, and includes three support surfaces, viz. a radial support surface, a tangential support surface and an axial support surface, wherein, at a distance from the axial support surface of the seat, in another support surface, there is formed a male- or female-like securing means having the latent purpose of—in co-operation with a complementary female- or male-like securing means in a cutting insert mounted in the seat—counteracting unintentional displacement of the same.

18. The tool head according to claim 17, wherein the securing means is a stop lug included in the radial support surface of the seat and having a shoulder surface facing the axial support surface and against which a contact surface included in a co-operating cutting insert is potentially pressable.

* * * * *